Patented May 15, 1928.

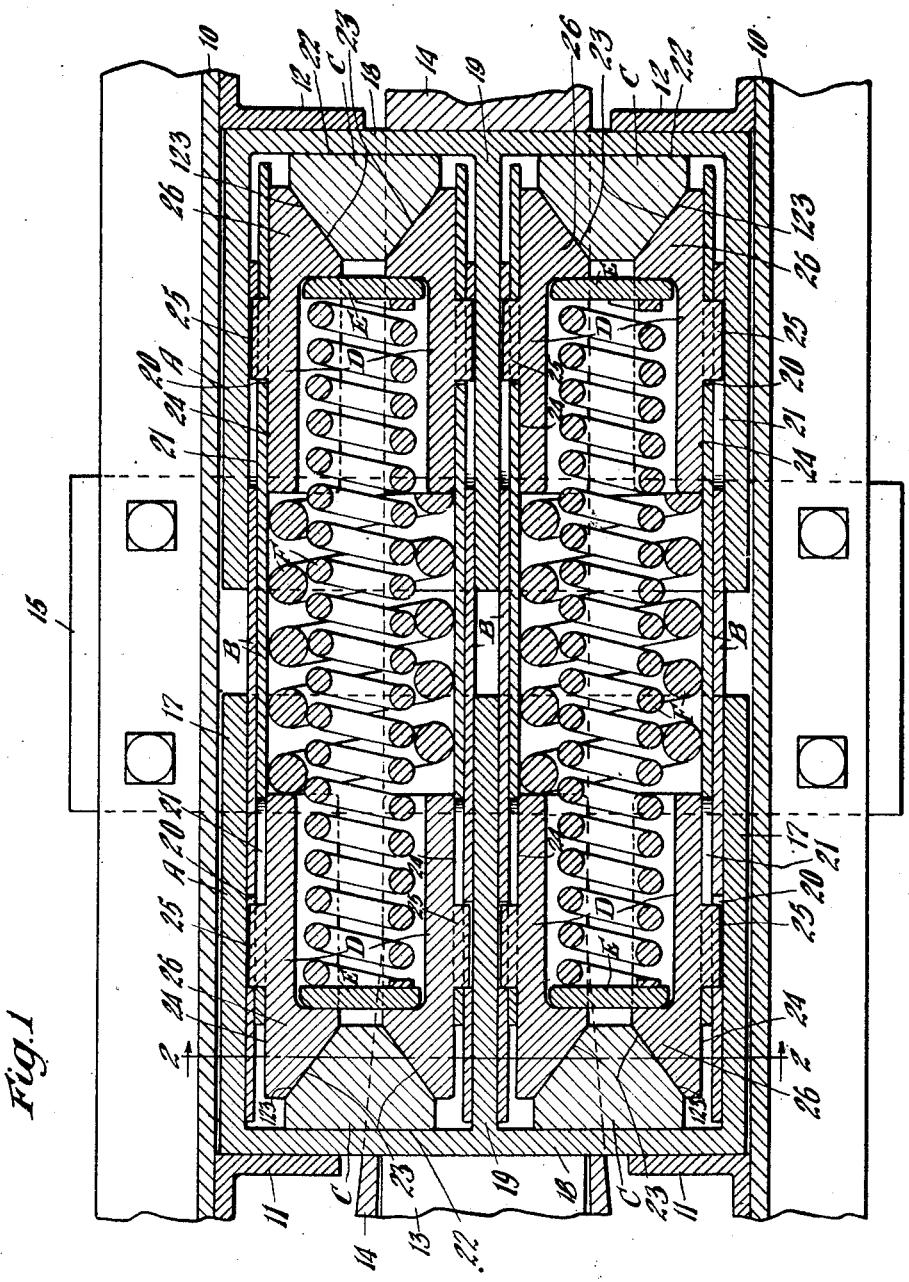

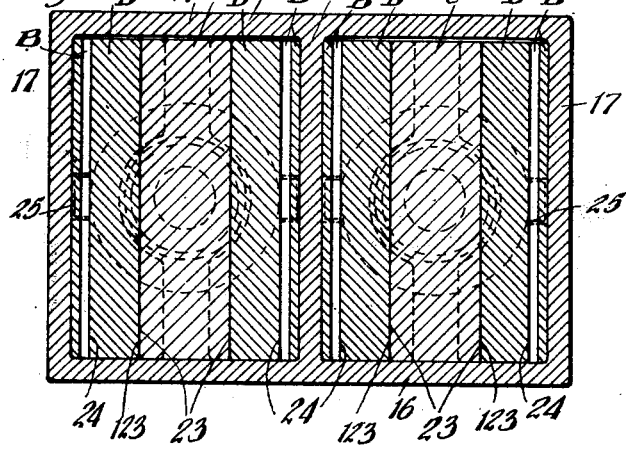
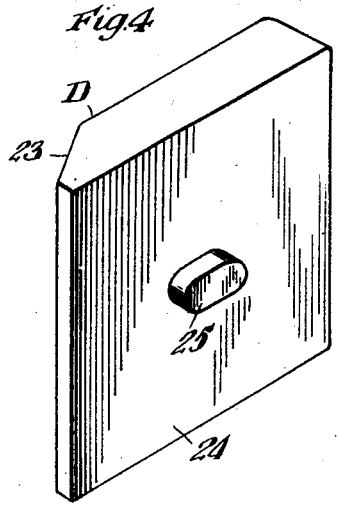
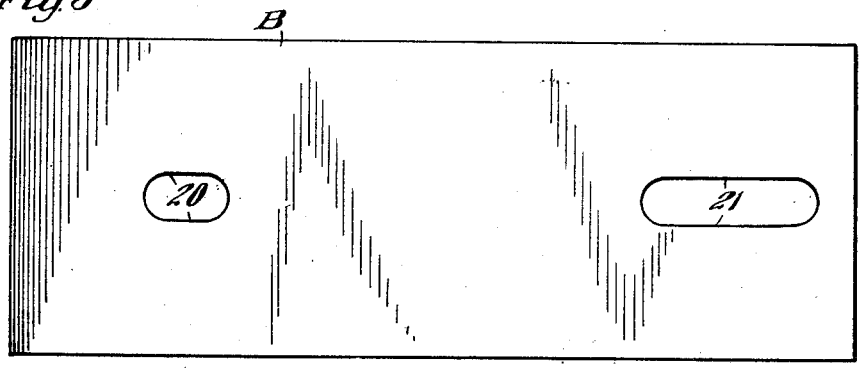

1,669,815

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 10, 1924, Serial No. 725,109. Renewed January 26, 1928.

This invention relates to improvements in friction shock absorbing mechanisms.

One object of this invention is to provide a friction shock absorbing mechanism of the friction plate type, particularly adapted for railway draft riggings, wherein is obtained high capacity due to large frictional areas, together with certain release.

Another object of the invention is to provide a mechanism of the character indicated, including twin arranged friction systems, each comprising friction plates and cooperating wedge friction means.

Other objects and advantages of the invention will more clearly and fully appear from the description and claims hereinafter following.

In the drawings, forming a part of this specification, Figure 1 is a longitudinal, horizontal, sectional view of a railway draft rigging, showing my improvements in connection therewith. Figure 2 is a vertical, transverse, sectional view of the shock absorbing mechanism proper, corresponding substantially to the line 2—2 of Figure 1. Figure 3 is a detail, side elevational view of a friction plate used in connection with my improved mechanism. And Figure 4 is a detail, perspective view of a friction shoe used in connection with said mechanism.

In said drawings, 10—10 indicate channel-shaped center or draft sills of a railway car underframe, to the inner faces of which are secured front stop lugs 11—11 and rear stop lugs 12—12. The inner end portion of the drawbar is indicated at 13, to which is attached a hooded yoke 14 of usual construction. The shock absorbing mechanism proper, including front and rear follower acting casings, is disposed within the yoke 14, and the movable parts of the draft rigging are supported by a saddle plate 15 detachably secured to the draft sills.

The improved shock absorbing mechanism proper, comprises broadly, front and rear follower casings A—A; a plurality of friction plates B—B; a pair of front and a pair of rear wedge blocks C—C; two pairs of front and two pairs of rear friction shoes D—D; a pair of front and a pair of rear spring followers E—E; and twin arranged spring resistance elements F—F.

The front and rear follower casings A—A are of like construction and have horizontally disposed, spaced, top and bottom walls 16—16, longitudinally disposed, spaced, vertical side walls 17—17, a transverse, vertically disposed end wall 18 and a longitudinally disposed, vertical center partition wall 19. The center partition wall 19 divides each casing into a pair of friction shells, and the side walls 17 and the center partition wall 19 present oppositely disposed, interior friction surfaces, cooperating with the respective sets of friction plates B. Each of the casings A cooperates with the corresponding stop lugs in the manner of a main follower, and the inner ends of the casings are normally spaced apart, as clearly shown in Figure 1. The parts are so proportioned that the inner ends of the casings A will abut when the mechanism is fully compressed, the force being then transmitted directly through the casings to the corresponding stop lugs, preventing the spring resistance elements F from being driven solid.

The friction plates B are arranged in four sets, each set being composed of two relatively movable plates. The sets are arranged in pairs at opposite sides of the longitudinal center of the mechanism, one set of each pair cooperating with the friction surfaces of the corresponding side walls 17 of the front and rear casings A and the other set cooperating with the opposed friction surfaces of the partition walls 19 of the front and rear casings. The plates B are all of like construction, each plate having elongated openings 20 and 21 at the opposite ends thereof, the opening 20 being spaced a greater distance inwardly from the adjacent end of the plate than the opening 21 from the end adjacent thereto. As will be seen upon reference to Figure 3, the opening 21 is considerably longer than the openings 20, for a purpose hereinafter described. The cooperating plates of each set are reversely arranged, end for end, the innermost plate of each set having the end provided with the opening 20 disposed at the rear end of the mechanism and the other plate of each set having the end provided with the opening 20 disposed at the front end of the mechanism. As clearly shown in Figure 1, the innermost plate of each group has the rear end thereof normally, slightly spaced from the end wall 18 of the corresponding rear casing A and the outermost plate of each set has the front end thereof slightly spaced from the wall 18 of the front casing.

The wedges C, which are four in number, are arranged in pairs at opposite ends of the mechanism, one of said wedges being disposed within each friction shell. The wedges C are all of like design, each being in the form of a block having a transverse flat outer face 22 adapted to abut the inner surface of the corresponding end wall 18 of one of the casings A and a pair of inwardly converging wedge faces 23 at the inner end thereof, adapted to cooperate with the corresponding pair of friction wedge shoes D—D.

The friction wedge shoes D are all of like construction, and are arranged in pairs coacting with the respective wedges C. Each friction shoe is provided with a wedge face 123 at the outer end thereof, adapted to coact with the corresponding wedge face 23 of the wedge C, and an outer, longitudinally disposed flat side friction face 24 adapted to engage the inner surface of the innermost friction plate B of the corresponding set of plates. Each of the shoes D also has a laterally projecting lug 25 on the outer side thereof, disposed between the ends of the shoe and spaced equally from the top and bottom edges thereof. As clearly illustrated in Figure 1, the lug 25 of each of the front shoes D extends through the opening 21 of the innermost plate B of the corresponding set and projects into the opening of the outermost plate of said set, and the lug 25 of each of the rear shoes D extends through the opening 20 of the innermost plate of each set and projects into opening 21 of the outermost plate of said set. In this connection it will be noted that the lugs 25 have only slight longitudinal play in the openings 20, but have appreciable longitudinal movement within the openings 21 of said plates, the openings 21 being of such a length as to permit the necessary full relative movement of the friction plates during a compression stroke of the mechanism.

The spring resistance elements F each comprise a relatively light inner and relatively heavier outer coil. The inner coil has its opposite ends bearing on the corresponding front and rear spring followers E, which in turn bear on transverse abutment faces 26 at the inner ends of the wedge faces of the friction shoes D. The outer coil of each spring resistance F bears at its opposite ends on the inner ends of the corresponding front and rear pairs of shoes.

In the normal position of the parts, the lugs of the front and rear pairs of shoes D engage the outer end walls of the openings 20 and 21 of the plates B, thereby limiting the longitudinal separation of the front and rear pairs of shoes holding the same assembled with the springs F and spring followers E. The parts are so proportioned that the spring resistance elements F will be under initial compression when the shoes D are in the extreme outer position.

The operation of my improved shock absorbing mechanism is as follows. During a compression stroke of the mechanism, the follower casings A will be moved relatively toward each other, causing a relative approach of the front and rear pairs of wedge blocks C inwardly toward the center of the mechanism in unison therewith, setting up a wedging action between each wedge and the corresponding pair of shoes, thereby placing the sets of plates B under lateral pressure. At the same time, the shoes D will be carried inwardly toward each other with the wedges C, slipping on the friction surfaces of the innermost plates of the corresponding sets. This action will continue until the end wall 18 of the front follower casing A comes into engagement with the front ends of the outermost plates and the end wall 18 of the rear follower casing comes into engagement with the rear ends of the innermost plates of said sets, whereupon the plates composing said sets will be moved relatively to each other, greatly augmenting the resistance offered. This action will continue until the inner ends of the casings come into abutment, thereby limiting the relative movement as hereinbefore pointed out. When the casings come into abutment a column-load-sustaining member of great strength is provided thereby, the partition walls of the two casings providing a central bracing means or column in addition to the side, top and bottom walls of the casings. In this connection, it is pointed out that during the initial movement of the wedge shoes, that is, during the time that the shoes move relatively to the sets of plates B, the lugs 25 will move away from the outer end walls of the corresponding openings 20 and that the lugs will be spaced inwardly therefrom when the mechanism is fully compressed.

When the actuating force is reduced, the initial action will be a release of the wedging systems at the front and rear ends of the mechanism. During this time, there will be no release movement of the various friction plates B as the lugs 25 of the shoes are spaced from the outer end walls of the openings 20 of said plates. As the releasing action continues and the pairs of shoes at the front and rear ends of the mechanism move outwardly, the lugs 25 will engage with the end walls of the openings 20, picking up the plates and restoring the same to normal position. The separating movement of the front and rear pairs of wedge shoes D will be limited by engagement with the outer end walls of the openings 21, as hereinbefore pointed out.

I have herein shown and described what

I now consider the preferred manner of carrying out the invention, but the same is merely illustrative, and I contemplate all changes and modifications that come within the scope of the claims appended hereto.

I claim:

1. In a friction shock absorbing mechanism, the combination with front and rear follower casings, movable relatively toward and away from each other, each having longitudinally disposed, spaced top, bottom and side walls and a longitudinally disposed, central partition dividing said casing into twin friction shell sections, bracing said casing longitudinally, said shell sections each having opposed interior friction surfaces the inner ends of said casings being adapted to abut upon full compression of the mechanism to provide a solid column-load-sustaining member; of a plurality of longitudinally disposed friction plates cooperating with said shell friction surfaces, said plates being divided into twin pairs of groups; spreading means interposed between each pair of groups, said spreading means comprising a wedge and a pair of cooperating friction shoes at each end of the mechanism; and a spring resistance cooperating with each spreading means.

2. In a friction shock absorbing mechanism, the combination with a plurality of longitudinally disposed, relatively movable friction plates; of means for placing said plates under lateral pressure, said means including a lateral pressure resisting member and a lateral pressure creating system, said system including wedge pressure transmitting members at opposite ends of the mechanism and a pair of friction shoes cooperating with each wedge member; lugs on said shoes cooperating with said plates for restoring the same to normal position; movement limiting means on said plates coacting with said lugs for limiting the separation of said shoes longitudinally of the mechanism; and a main spring resistance.

3. In a friction shock absorbing mechanism, the combination with front and rear friction casings having interior, opposed friction surfaces; of a plurality of longitudinally disposed, relatively movable friction plates, said plates being divided into two separated groups; a pressure transmitting wedge at each end of the mechanism; a pair of friction wedge shoes cooperating with each wedge and frictionally engaging said groups of plates, each of said plates having abutment means at the opposite ends thereof; lugs on said shoes at the opposite ends of the mechanism, said lugs cooperating with the abutment means at the opposite ends of said plates for limiting the separation of said shoes longitudinally of the mechanism; and a main spring resistance coacting with each front and rear pair of shoes.

In witness that I claim the foregoing I have hereunto subscribed my name this 1st day of July, 1924.

WILLIAM A. GEIGER.